United States Patent
Bryc

(10) Patent No.: US 11,625,328 B2
(45) Date of Patent: *Apr. 11, 2023

(54) MONITORING SERVICE FOR PRE-CACHED DATA MODIFICATION

(71) Applicant: Home Box Office, Inc., New York, NY (US)

(72) Inventor: Michal M. Bryc, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,189

(22) Filed: Aug. 2, 2021

(65) Prior Publication Data

US 2021/0357331 A1 Nov. 18, 2021

Related U.S. Application Data

(63) Continuation of application No. 16/736,217, filed on Jan. 7, 2020, now Pat. No. 11,106,590, which is a (Continued)

(51) Int. Cl.
*G06F 12/0862* (2016.01)
*G06F 12/0891* (2016.01)
(Continued)

(52) U.S. Cl.
CPC ...... *G06F 12/0862* (2013.01); *G06F 12/0891* (2013.01); *G06F 12/128* (2013.01); *G06F 16/24552* (2019.01); *H04L 67/568* (2022.05); *G06F 2212/154* (2013.01); *G06F 2212/163* (2013.01); *G06F 2212/60* (2013.01); *G06F 2212/6024* (2013.01)

(58) Field of Classification Search
CPC ............ G06F 12/0862; G06F 12/0891; G06F 12/128; G06F 16/24552; G06F 2212/154; G06F 2212/163; G06F 2212/60; G06F 2212/6024; H04L 67/568
See application file for complete search history.

(56) References Cited

U.S. PATENT DOCUMENTS

| 9,414,222 B1 | 8/2016 | Dixon et al. |
| 2013/0110910 A1 | 5/2013 | Ikeda |

(Continued)

OTHER PUBLICATIONS

Non-Final Office Action received for U.S. Appl. No. 15/625,366 dated Nov. 29, 2018 ,22 pages.
(Continued)

*Primary Examiner* — Eric Cardwell
(74) *Attorney, Agent, or Firm* — Amin, Turocy & Watson, LLP

(57) ABSTRACT

The described technology is generally directed towards detecting and propagating changes that affect information maintained in a cache. Data may be pre-cached in advance of its actual need, however such data can change, including in various different source locations. A change monitoring/signaling service detects relevant changes and publishes change events to downstream listeners, including to a cache population service that updates pre-cache data as needed in view of such data changes. Per-user-specific data also may be pre-cached, such as when a user logs into a data service.

20 Claims, 11 Drawing Sheets

Related U.S. Application Data continuation of application No. 15/625,366, filed on Jun. 16, 2017, now Pat. No. 10,565,116.

(51) Int. Cl.
    *G06F 12/128*     (2016.01)
    *G06F 16/2455*     (2019.01)
    *H04L 67/568*     (2022.01)

(56)             References Cited

U.S. PATENT DOCUMENTS

2016/0314220 A1*   10/2016   Sachdev ............. G06F 16/9038
2017/0344481 A1    11/2017   Pack et al.

OTHER PUBLICATIONS

Final Office Action received for U.S. Appl. No. 15/625,366 dated Jun. 28, 2019, 24 pages.
Non-Final Office Action received for U.S. Appl. No. 16/736,217 dated Jan. 26, 2021, 39 pages.

* cited by examiner

MONITORING SERVICE FOR PRE-CACHED DATA MODIFICATION

CROSS-REFERENCE TO RELATED APPLICATION

This application is a continuation of, and claims priority to each of, U.S. patent application Ser. No. 16/736,217, filed on Jan. 7, 2020, entitled "MONITORING SERVICE FOR PRE-CACHED DATA MODIFICATION, which is a continuation of U.S. patent application Ser. No. 15/625,366, filed on Jun. 16, 2017, entitled "MONITORING SERVICE FOR PRE-CACHED DATA MODIFICATION", and now issued as U.S. Pat. No. 10,565,116. The entirety of the aforementioned application is hereby incorporated herein by reference.

BACKGROUND

In data services that serve content to clients, caching of appropriate data can provide many benefits. For example, consider a data service that offers content such as movies and television series to subscriber viewers. The interactive items on a user interface by which a user may select content for playback may be composed of various user interface elements such as menus, icons, tiles, text, graphics, images and so forth. Some of these elements may need to be obtained and built from different data sources, with the data having to be shaped and formatted for different device types and client software (application) versions running on those devices. Doing this for each of the many movies and television shows consumes a significant amount of computing resources; however because many users want the same user interface data items, caching can eliminate a great deal of redundant data access and processing.

Pre-population of a cache with likely relevant data is feasible, but leads to other problems. One notable problem is that the source data often changes. For example, the data item representing a piece of content that is being offered at 4:00 pm tomorrow may be placed in a cache, but a news event may occur that changes the regularly scheduled programming at or around that time, whereby such pre-cached data becomes obsolete. Further, other data changes may be made by editors at any time; for example, an editor may decide that an image that ordinarily is used with a television series' data item may be overridden with a more specific image for one particular episode of that series. Another editor may decide to specially showcase two different movies per day on users' main menus, which means that any pre-caching needs to wait for the editor's decision. Still further, movies may be listed under a "most popular" category, which changes from time to time based upon counts of actual user requests for different movies.

In sum, when data items including those composed from combinations of user interface elements are needed, a significant amount of computing resources are used to support on-demand user requests for the items. Pre-building and pre-caching of such data items saves many resources relative to composing such data items on demand, but needs to deal with frequent and sometimes unpredictable changes.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards obtaining a change event that identifies an entity and a type of change with respect to the entity, and using the change event to determine one or more corresponding data sources related to the entity. Aspects include obtaining data from the one or more corresponding data sources and pre-caching one or more data items corresponding to the data in a cache for anticipated future access. Obtaining the change event may comprise receiving a propagated event, e.g., monitored by a service that detects changes and propagates change events.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards notifying a consumer entity of a change event that affects pre-cached data and/or data to be cached. The technology facilitates replacement of data, including data that is cached for future use, which has become obsolete because of the change event.

In one or more aspects, various data sources are monitored for changes relevant to pre-cached data. A publisher-subscriber system publishes events (e.g., in the form of messages related to such changes), including to a cache population service. Changes that affect pre-cached data items (e.g., for anticipated future use) result in one or more appropriate modifications to the cache.

In one or more other aspects, a client-facing front end data service is monitored for changes in user login/logout status. The publisher-subscriber system publishes user login/logout events (e.g., in the form of messages related to such changes), including to a user-specific data caching service, e.g., a "watchlist" service. This allows advance fetching of per-user data items, such as a watchlist of data items corresponding to a user's favorite shows or the like, which may be cached in anticipation of its need in response to detection of a user login operation. Rather than building the watchlist on demand when needed, monitoring and publishing of the log-in event may be used by a consuming entity to fetch and assemble the user's watchlist into the cache in advance of its being needed, providing an improved user experience.

It should be understood that any of the examples herein are non-limiting. For instance, some of the examples refer to a data service that pre-caches data items for providing to users for interaction and, e.g., to select video content. However, the technology described herein is independent of any data items and/or purpose for the data. Thus, any of the embodiments, aspects, concepts, structures, functionalities or examples described herein are non-limiting, and the technology may be used in various ways that provide benefits and advantages in data communication and data caching in general.

Figure 1:
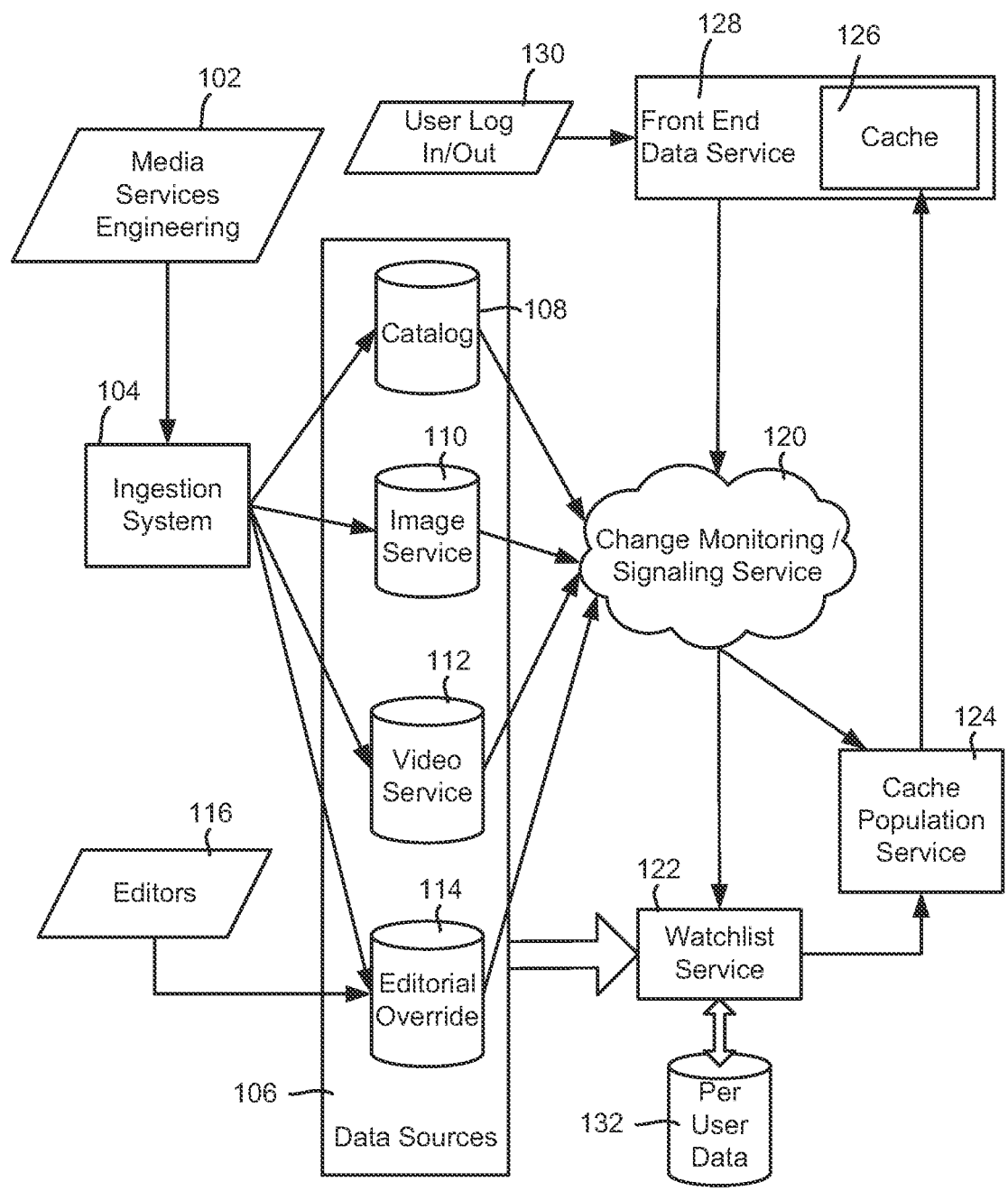
FIG. 1 is an example block diagram representation of a set of components that detect changes to data source data and user status changes to modify a cache with pre-cached data, according to one or more example implementations.

As generally represented in the example implementation of FIG. 1, a change producing entity, shown as media services engineering 102, makes changes related to content that is to be made available for user viewing. An ingestion system 104 obtains these changes, and outputs relevant information related to the content that needs to be updated in one or more various data sources 106. Example data sources include a catalog 108 of content-related items to be offered, an image service 110 that provides representative images for use in data items presented to a user for interactive selection, and a video service 112. The ingestion system 104 also may output editorial override information shown in the data store 114, and or one or more editors 116 such as an editorial team may place information in the editorial override data store 114 that overrides any data in the catalog 108, the image service 110 and so on.

A change monitoring/signaling service 120 detects and signals whenever a change to one of the data sources is made; for example an event may be output on any database write, along with information as to what information changed. Filtering, batching, sorting, classification and so on (e.g., this database write is of type "change" and is relevant to a data item associated with the root menu having an identifier of "urn:hbo:navigation_root") may be performed so that relevant events with contextual information are propagated to downstream listeners that are interested in certain types of events.

To propagate the relevant events, the change monitoring/signaling service 120 outputs a message (or other similar event notification) to consuming subscriber entities, two of which are exemplified in FIG. 1 as a user-specific data caching ("watchlist") service 122 and a cache population service 124. Note that instead of message propagation/publication, a feasible alternative is to place the messages in a commonly accessible storage or the like for polling by interested consumer entities. As used herein, the term "change event" with respect to an entity may be used interchangeably with "message" or "notification" and covers the concept of propagated change events as well as change events obtained via polling.

As described herein, for events that affect pre-cached data, the cache population service takes action to invalidate (and/or replace) any data made obsolete by the change in a cache 126, e.g., of a front-end data service 128. This prevents incorrect pre-cached data items from being served when they would otherwise become active at a specified time. Note that the cache 126 may be a REDIS cache coupled to the front end data service's servers, for example. Further note that a back-end data service, not explicitly shown, may participate in the collection of the data from one or more of the various data sources 106 that is then used in updating the cache with modified pre-cached data.

Another type of event, which is independent of the data sources 106, relates to events 130 that affect user login statuses. Such events are detected at the front end data service 128. For login events, the watchlist service 122 may pre-populate the cache 126 with information based on per-user data 132; (that the cache is the same front-end cache 126 in one or more implementations, e.g., a REDIS cache, but may be a different cache in other implementations). Note that in FIG. 1 the watchlist service's modification to the cache 126 is shown as occurring via the cache population service 124, however it is understood that a more direct cache update may be performed, and/or that other intermediary entities may be involved in updating the cache. Thus, as used herein, the service 122 caches data (or invalidates cached data) in the cache regardless of whether via direct or indirect access.

Figure 2:
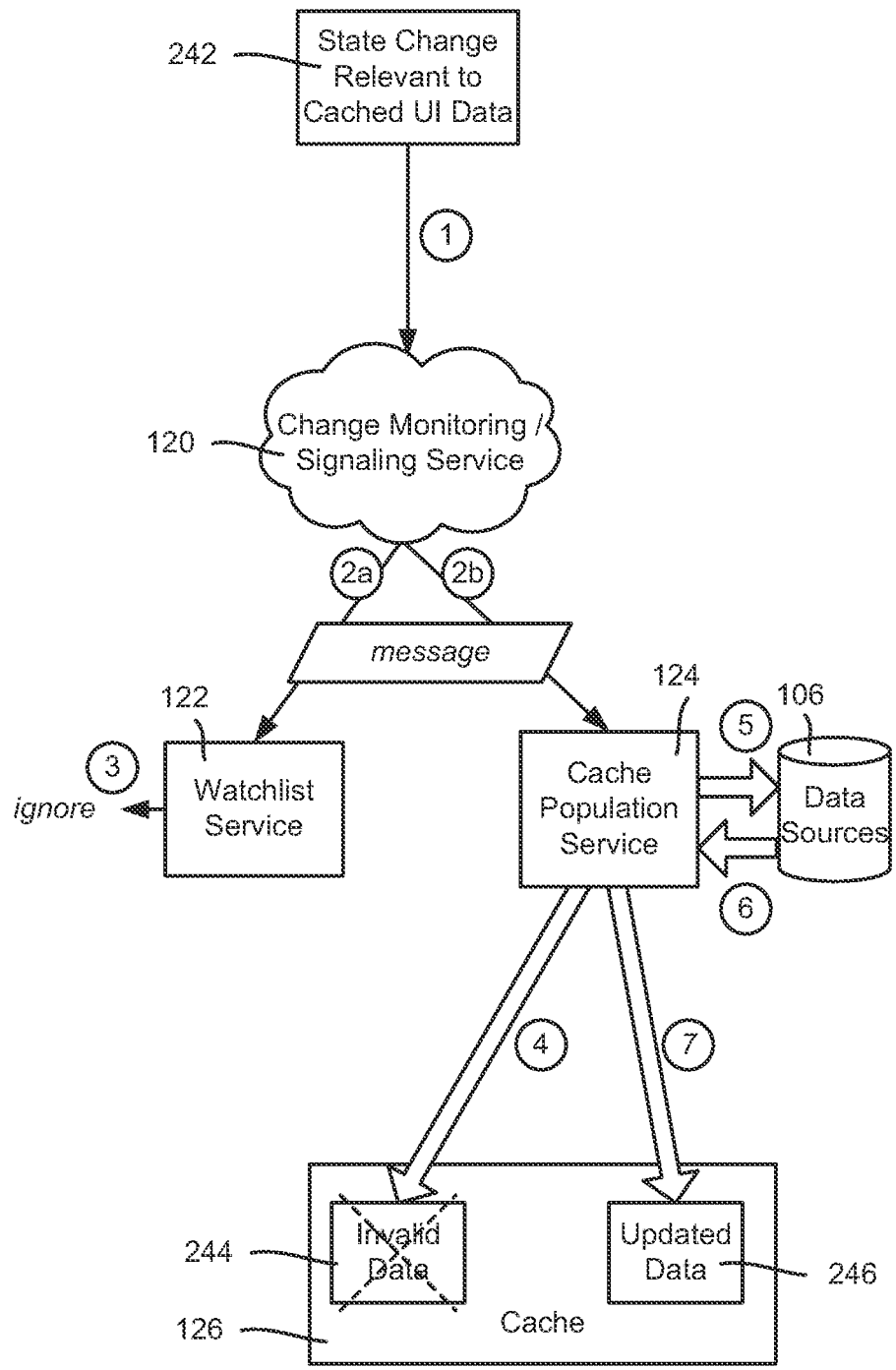
FIG. 2 is an example block/data flow diagram representation of how a state change relative to cache user interface data is used to modify pre-cached data, according to one or more example implementations.

FIG. 2 exemplifies a state change 242 detected by the change monitoring/signaling service 120 that affects pre-cached data, as shown via labeled arrow one (1). As set forth above, this may be a programming change, an editorial override and so on. In the example of FIG. 2, the change monitoring/signaling service 120 sends a message (publishes an event) to listener subscribers, shown via labeled arrows (2a) and (2b), including the watchlist service 122 and cache population service 124. In general, the message identifies the type of event, e.g. a change, along with information as to what data item changed, e.g., via an identifier of the data item that was changed. It is feasible for multiple changed data items to be identified in a single change-type message.

As shown via labeled arrows (2a) and (3), the watchlist service 122 may receive but ignore this change, because for example the watchlist service 122 is not interested in data item changes. It is also feasible to have an implementation in which the change monitoring/signaling service 120 filters out events for which subscribers have not registered, in which situation arrow (2a) in FIG. 2 does not exist. Still further, it is understood that polling may be performed by interested entities instead of event notification message sending and receiving.

The cache population service 124, which may include its own monitoring service, also receives this message as shown via labeled arrow (2b). In general, the cache population service 124 recognizes that some pre-cached data in the cache 126 is now invalid because of the change, and thus marks or otherwise takes action to invalidate relevant portions 244 of the data in the cache 126, as represented in FIG. 2 via labeled arrow four (4). Further, the cache population service 124 may insert updated data 246 into the cache 126 as represented by labeled arrows five (5) through seven (7). To this end the cache population service 124 may use data from the data sources 106 as source data for the update, which may involve collection and retrieval of the data via a back-end data service and processing via the front-end data service 128 of FIG. 1.

Figure 3:
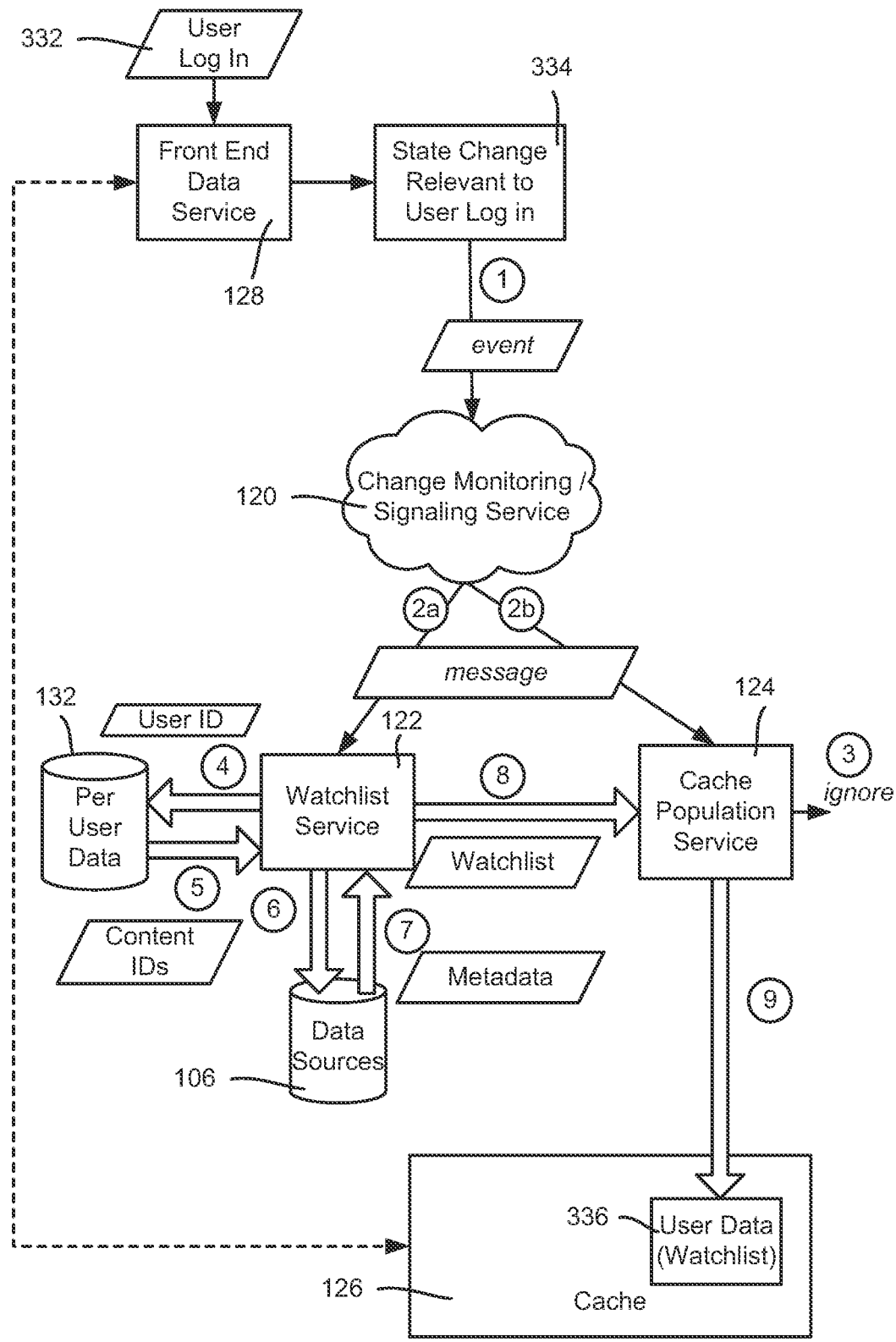
FIG. 3 is an example block diagram/data flow representation of how a state change relative to a user login to a data service may be used to pre-cache user-specific data, according to one or more example implementations.

FIG. 3 exemplifies a user log in 332 initiated at the front-end data service 128, with corresponding state change information 334 output as an event or the like that is detected at the change monitoring/signaling service 120 as shown via labeled arrow one (1). This results in a message (or messages) being output to downstream listeners, including the watchlist service 122 and cache population service 124, as represented in FIG. 3 via labeled arrows (2a) and (2b).

In this example, the cache population 124 ignores the message as represented via labeled arrow three (3). The watchlist service 122 however recognizes this message type and its accompanying user identification data in order to retrieve per-user-specific data 132 as represented via labeled arrows four (4) and five (5). In one or more example implementations, the per-user data 132 comprises a watchlist, which in general is a set of content identifiers associated with that user. For example, a user may manually add a television series to his or her watchlist, the user's most frequently watched shows may automatically be added to a user's watchlist, and so on. The content IDs of any particular user's watchlist thus may be returned for any given user.

As further shown in FIG. 3, the watchlist service 122 may retrieve data items (their metadata) from the data sources 106 corresponding to the content IDs, as generally represented via labeled arrows of six (6) and seven (7). The watchlist for the logging in user is then cached. In this example the cache population service 124 is invoked to cache the watchlist 336 as represented via labeled arrows eight (8) and nine (9), however it is understood that the watchlist service 122 may cache information directly and/or through one or more other intermediaries. In any event, the watchlist is now cached for rapid retrieval by the user, e.g., from the user's root menu that appears after a successful login.

Figure 4:
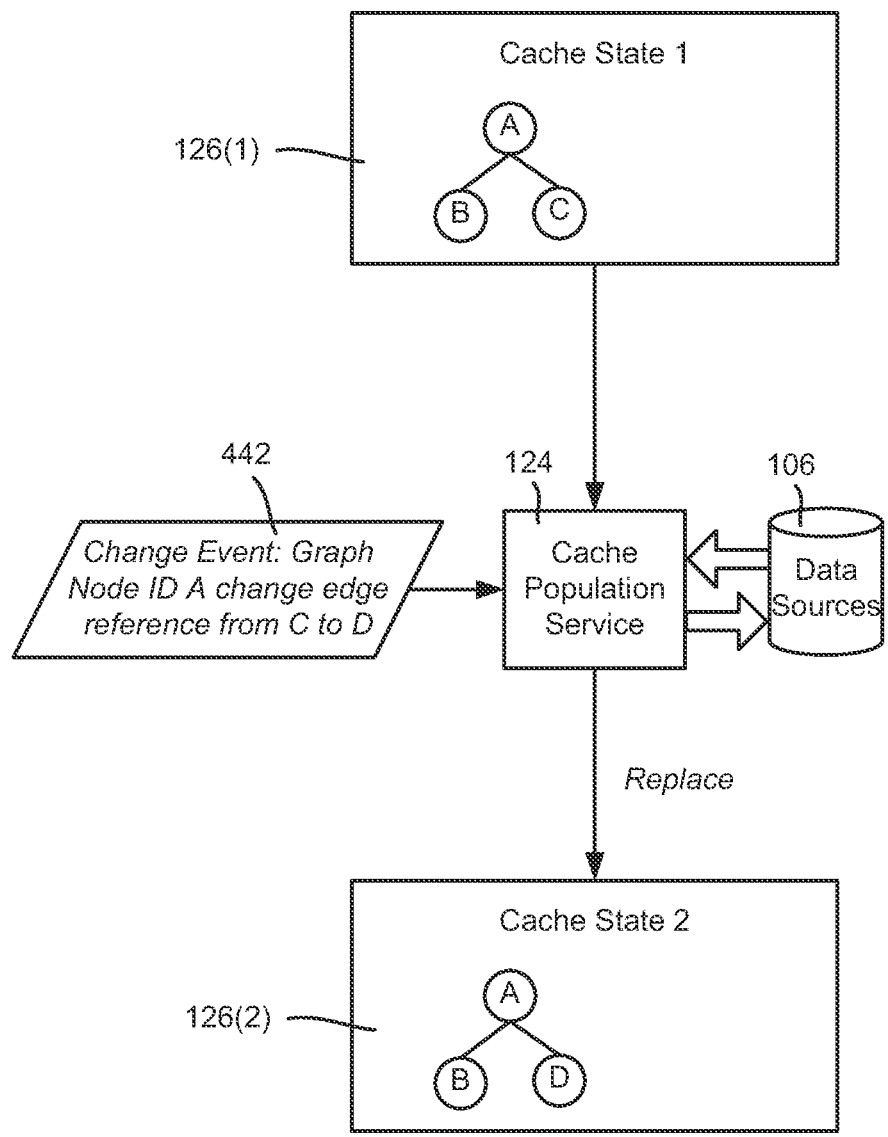
FIG. 4 is an example block diagram representation of how pre-cached data may be modified by an upstream change, according to one or more example implementations.

FIG. 4 shows an example of how a cache state may change as a result of a change event. Consider that a cache state 126(1) includes a graph of nodes A, B and C as shown in FIG. 4. As represented by the change event 442, the node A has been changed in an upstream operation to reference the node D instead of the node C. The cache population service 124 in this simplified example replaces the node C with the node D in the cache, resulting in the cache state 126(2).

It should be noted that with a cached graph, it may not be feasible or efficient to simply replace a child node as in FIG. 4. This is generally because a graph allows complex relationships between nodes, including cycles back to a node and so on. In such instances, a cached graph may need to be replaced in its entirety. Note that in one or more implementations, automatic graph set generation typically takes place 24 to 36 hours in advance, and present, there are approximately nine such changes occur per day that affect pre-cached graphs.

Figure 5:
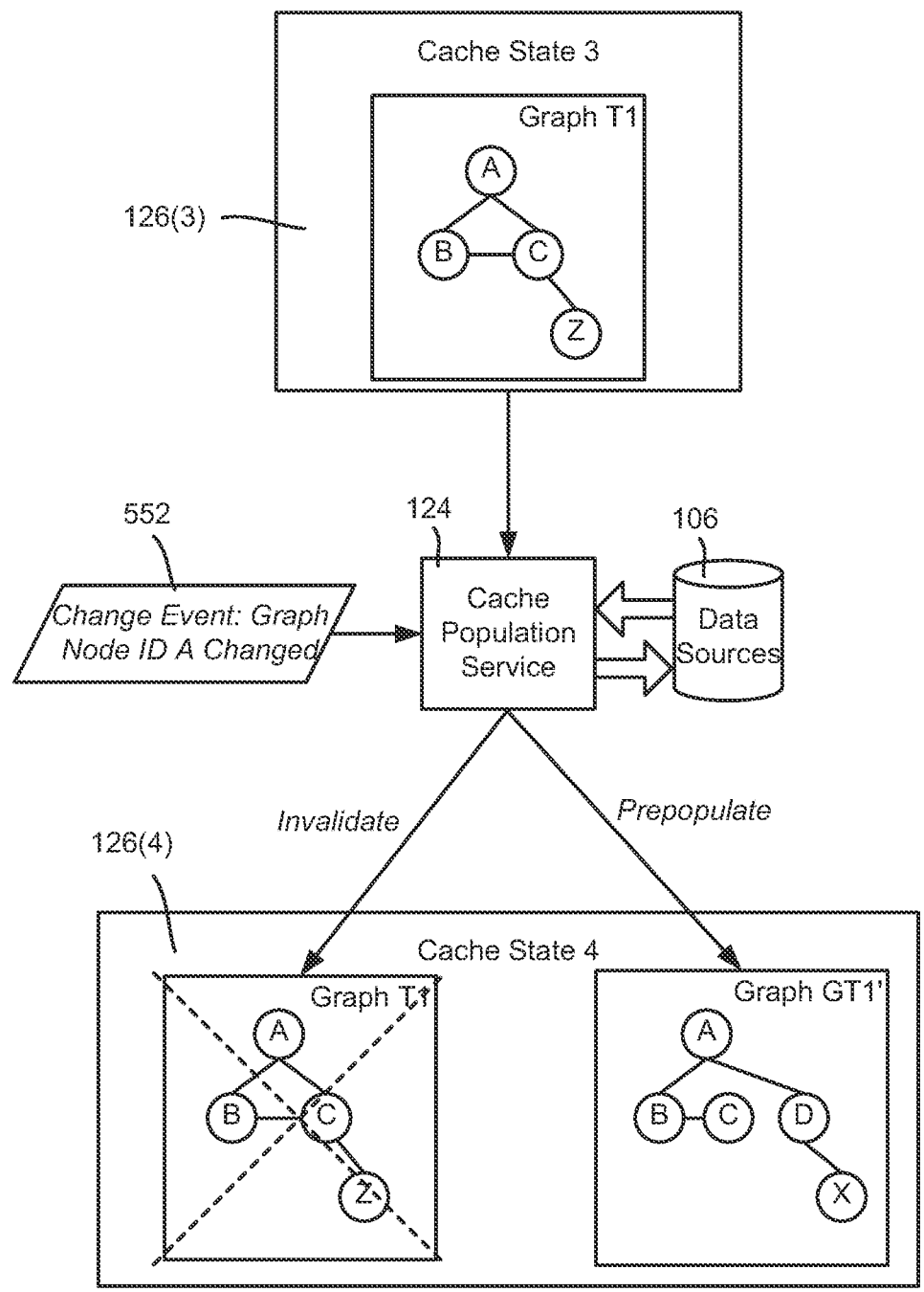
FIG. 5 is an example block diagram representation of how pre-cached data may be invalidated and replaced with new pre-cached data by an upstream change, according to one or more example implementations.

FIG. 5 shows a graph comprising nodes A, B, C and Z to be used at some future time T1 within cache state 126(3). A change event 552 indicates that node A has changed, which in this example similarly changes node C to node D. However, simply replacing node C with node D may not work because for example node D references a node X that may not be cached. Further, there is an edge relationship between the nodes B and C, meaning that the node C needs to remain in the updated graph.

Thus, in FIG. 5, the cache population service 124 invalidates the entire graph T1, as shown in the cache state 126(4). Note that the invalidated data may not be directly deleted; instead subsequent garbage collection or other mechanisms may be used to actually reclaim the cache space. Further, generally as soon as possible, the cache population service 124 obtains relevant data from the data sources 106 to generate and pre-populate the cache with a new graph for this time T1, shown in the cache state 126(4) as graph T1'.

Figure 6:
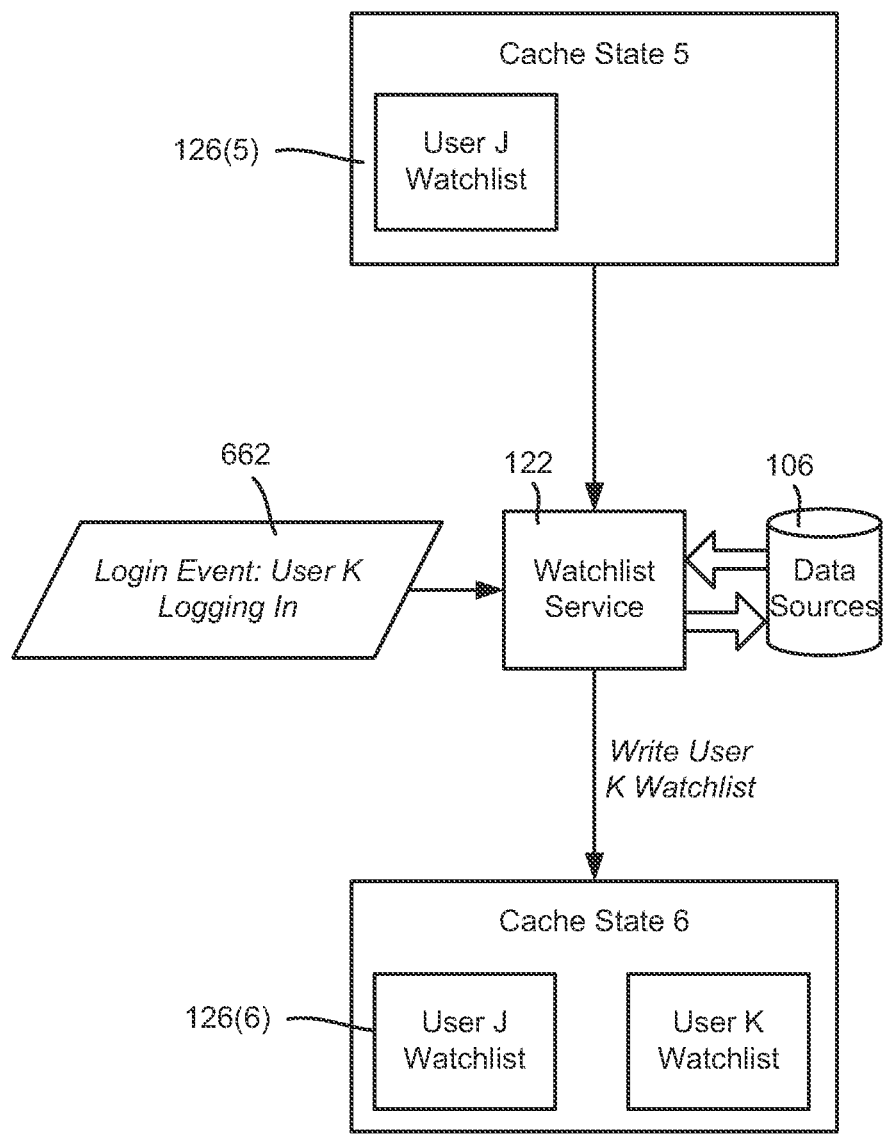
FIG. 6 is an example block diagram representation of how user-specific data may be pre-cached via a status change, according to one or more example implementations.

FIG. 6 shows how the cache state changes based on a user login event 662. Consider that the cache state 126(5) contains user J's watchlist. When a user K logs in, a message/event 662 reaches the watchlist service 122, which as described above obtains the data items for the user K's watchlist. Thus, the cache state 126(6) is updated to include the user K's watchlist.

Figure 7:
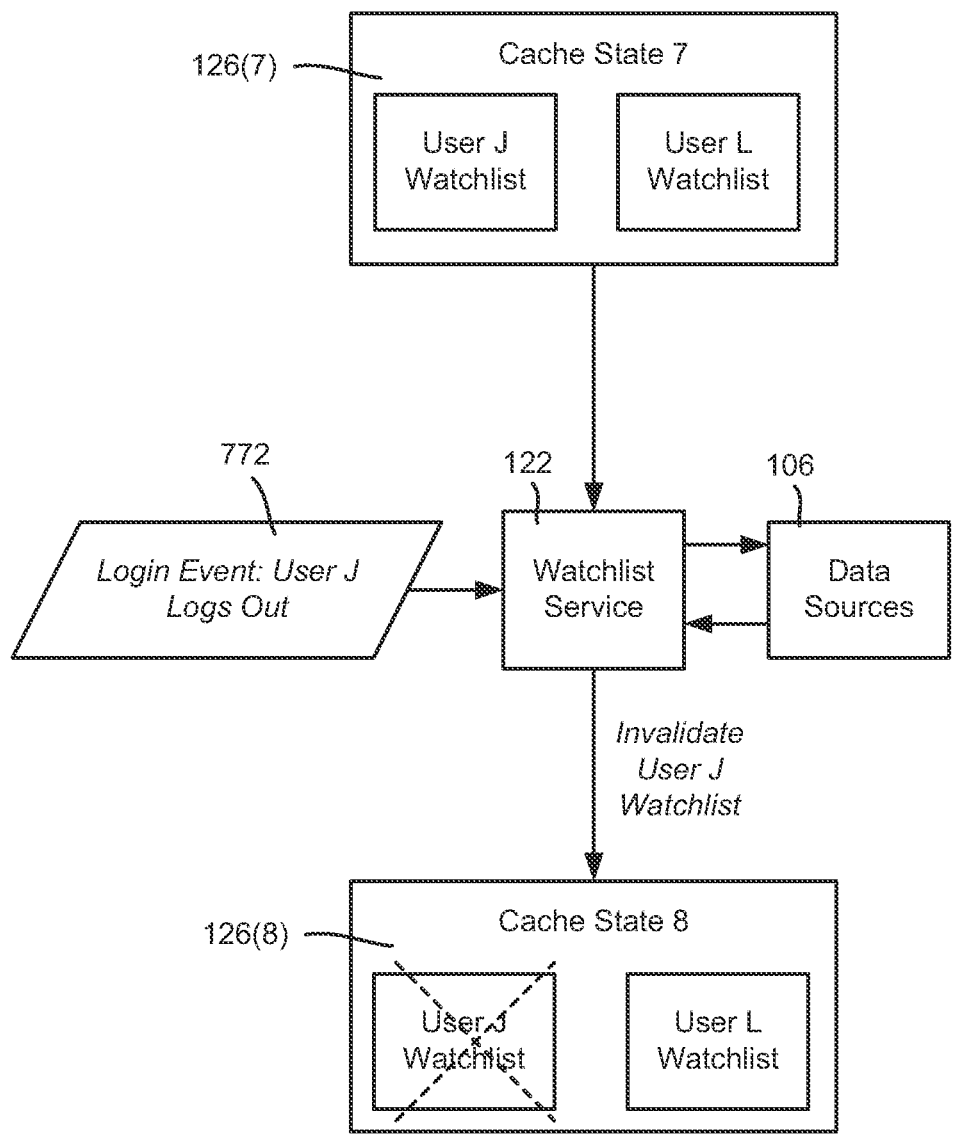
FIG. 7 is an example block diagram representation of how cached user-specific data may be invalidated in response to a status change, according to one or more example implementations.

The cache may be modified to reflect when a user logs out as well, so that, for example, allocated per-user watchlist cache space can be reclaimed. Consider that as exemplified in FIG. 7 the cache state 126(7) contains the user J's watchlist and a user L's watchlist. When the user J logs out, a message/event 772 reaches the watchlist service 122. Thus, the cache is modified to invalidate the user J's watchlist, shown in FIG. 7 as the cache state 126(8).

Figure 8:
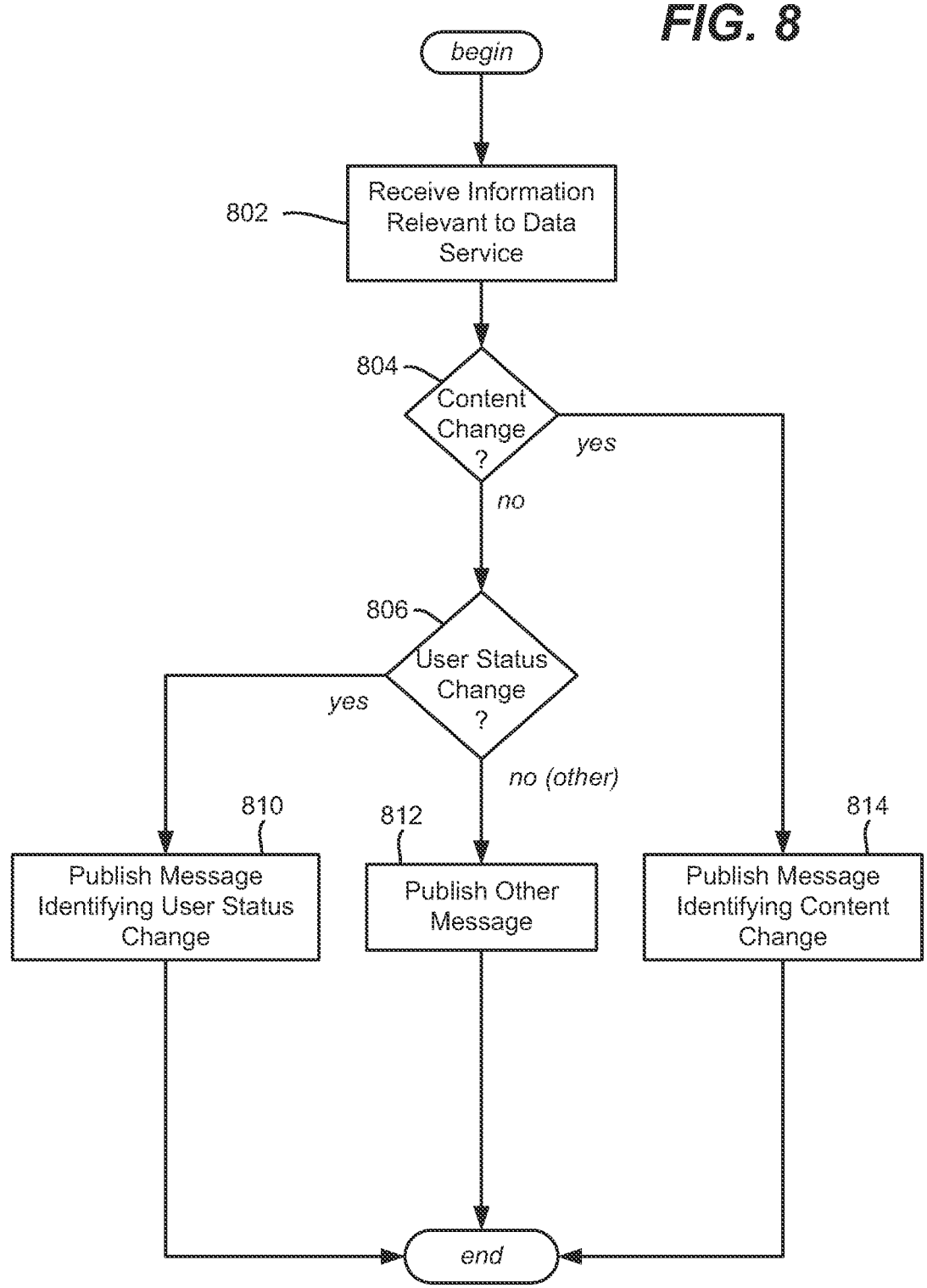
FIG. 8 is a flow diagram showing example steps that may be taken to propagate change events, according to one or more example implementations.

FIG. 8 is a flow diagram showing example operations in the form of steps related to the change monitoring/signaling service 120. Step 802 represents receiving information that is relevant to the data service, e.g., a change to one of the data sources databases, the log-in event, as well as other possible events.

Step 804 represents evaluating the type of change, such as whether it is a content-related change to a data item that possibly affects pre-cached data. Note that the affected data may already be cached or may be in the process of being prepared for caching. If so, step 804 branches to step 814 to publish a message identifying the content-related change; for example the message may include the change type an identifier of the data item that changed.

If not a content-related change as evaluated at step 804, a user status related change may have been received at step 802. Step 806 looks for such a user status change, and if this is the type of change publishes a message at step 810 identifying the user status change along with the user ID.

Step 812 represents publishing one or more other messages for other types of changes or other events that need to be propagated to downstream listeners. Although not explicitly shown in FIG. 8, it is also understood that no message may be sent in other circumstances.

Figure 9:
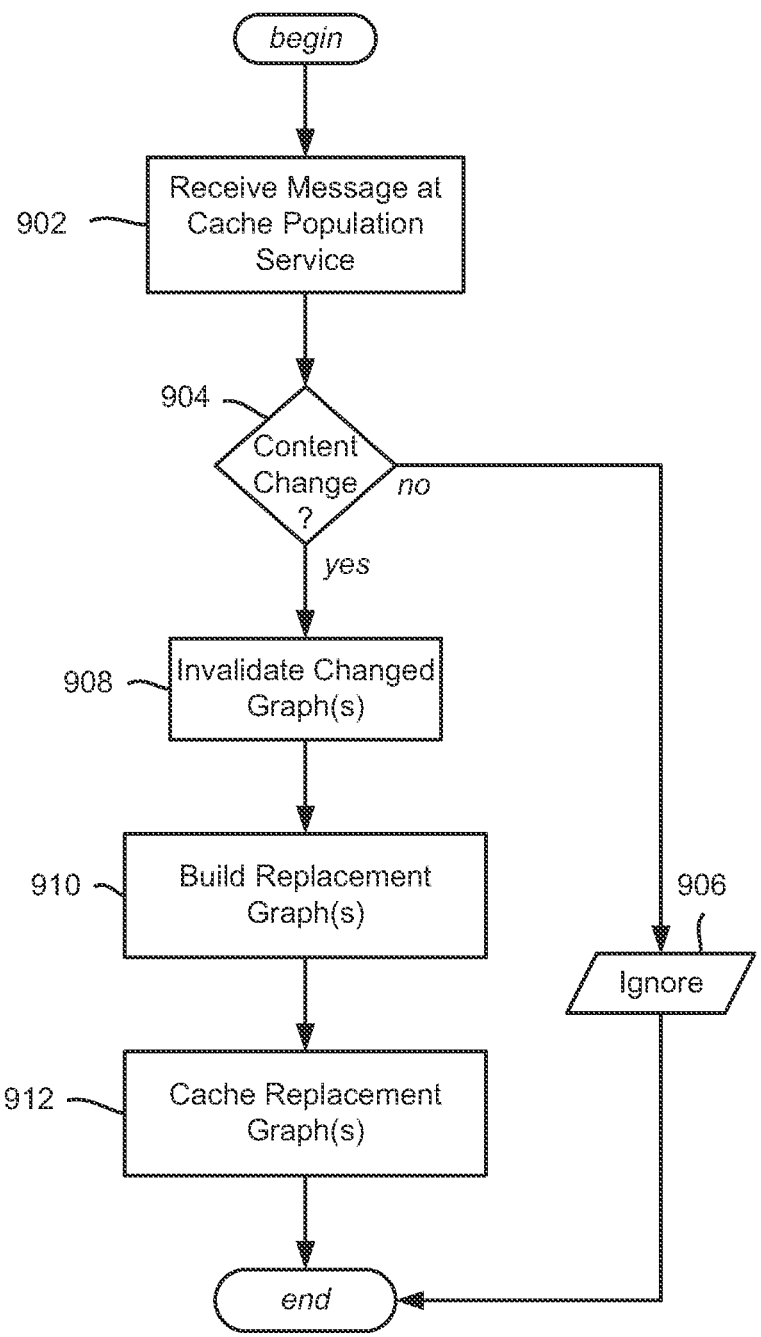
FIG. 9 is a flow diagram showing example steps that may be taken to modify pre-cached data in response to a content-related change request, according to one or more example implementations.

FIG. 9 is a flow diagram representing example operations of the cache population service 124 (FIG. 1) that receives messages as a downstream listener, as generally represented at step 902. In an implementation in which the cache population service receives such messages, along with other messages in which the cache population service is not interested, step 904 allows for ignoring (via step 906) the messages deemed not relevant.

For content-related (data item) change messages, step 904 branches to step 908 which invalidates any graph that has been changed as a result of the content-related change. Note that multiple graphs may be affected by a single content-related change. Further, note that the logic of FIG. 9 corresponds to the example of FIG. 5 in which graphs are replaced in their entirety (in contrast to FIG. 4 in which a portion of a graph can be replaced).

Step 910 represents building the one or more replacement graphs which are then cached at step 912. In this way, pre-cached data is able to automatically remain valid in advance of the time the data will be needed even when changes are made after initial caching, including in view of frequent and sometimes unpredictable changes.

Figure 10:
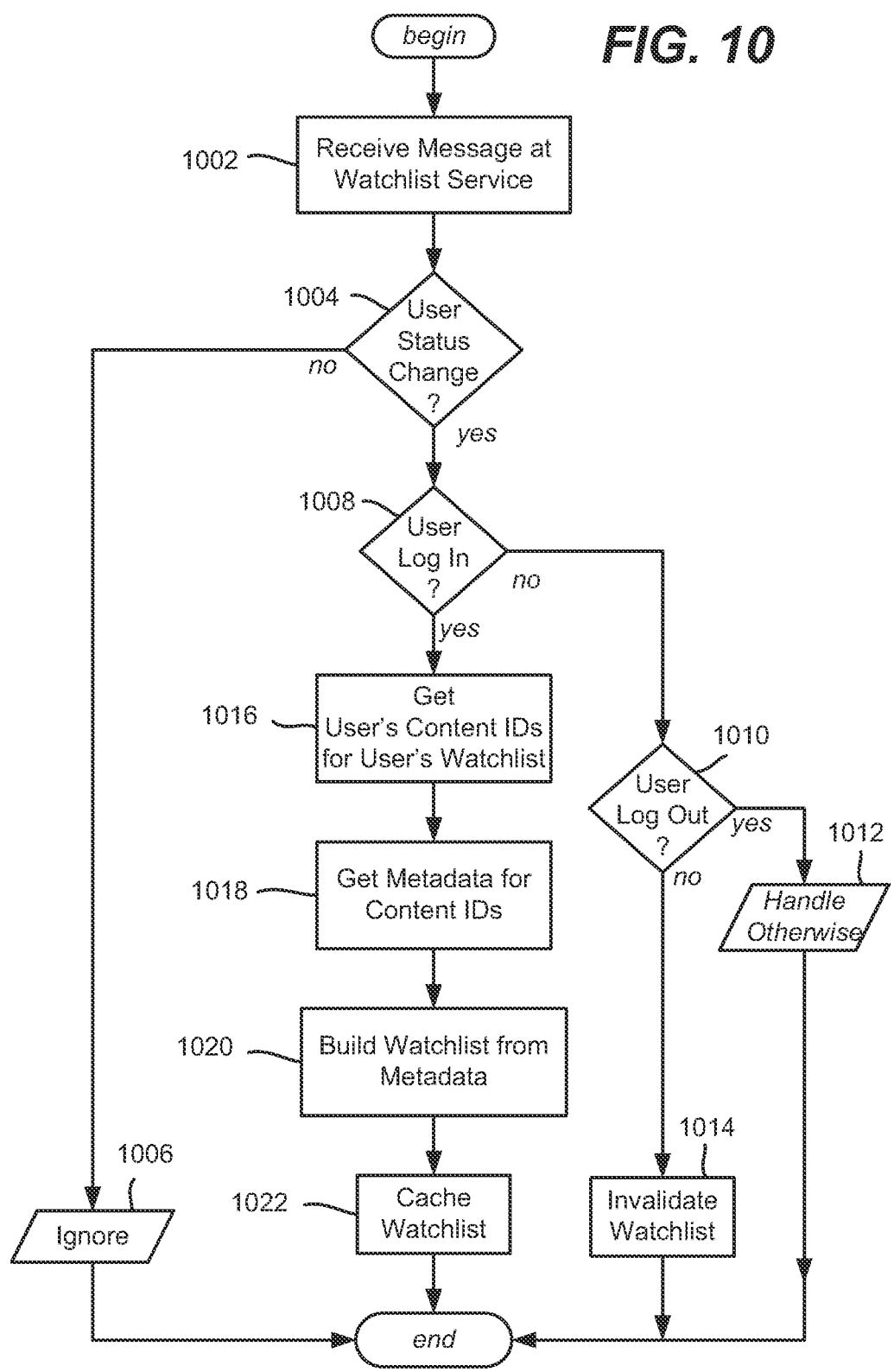
FIG. 10 is a flow diagram showing example steps that may be taken to modify user-specific cached data in response to a user status change, according to one or more example implementations.

FIG. 10 is a flow diagram representing example operations of the watchlist service 122 (FIG. 1), beginning at step 1002 where the watchlist service receives a message. Again, in this example, the watchlist service filters out messages in which it is not interested via steps 1004 and 1006.

If interested, step 1008 evaluates whether the message is for a user login. If not step 1010 evaluates whether the message is for a user log out, and if not handles the message otherwise as represented at step 1012. For example, a user status change message may be received that indicates that a user has not interacted in X minutes; until X reaches some threshold value, the watchlist service may not take any action, whereas after X reaches the threshold value, the watchlist service may consider the user logged out with respect to removing that user's watchlist from the cache.

For a user log out operation as detected at step 1010, step 1014 invalidates the watchlist. For a user login operation as detected at step 1008, steps 1016 through 1022 are performed.

Step 1016 represents getting the user's content IDs for the user's watchlist. Step 1018 retrieves the metadata for those content IDs, and builds the watchlist from the metadata at step 1020. Step 1022 then caches the watchlist.

As can be seen, described is a technology that allows the pre-caching of data based on changes that occur at upstream entities. The technology propagates changes to downstream listeners, which allows data to be automatically cached that reflects those changes. This includes data that is cached in advance for likely use at a future time, including user interface graphs for content selection, per-user-specific data, as well as any other cached data that needs to be updated. The monitoring and publishing of relevant changed events thus used to invalidate graph sets and insert new or replacement graphs (in a timeline of future graphs). Further, when a client user logs in, there may be user-specific data pre-cached for the user, such as the user's watchlist that is customized for that user.

One or more aspects are directed towards obtaining a change event that identifies an entity and a type of change with respect to the entity and using the change event to determine one or more corresponding data sources related to the entity. Aspects include obtaining data from the one or more corresponding data sources and pre-caching one or more data items corresponding to the data in a cache for anticipated future access. Obtaining the change event may comprise receiving a propagated event.

Other aspects may comprise monitoring for a change to a data source, detecting a change, and propagating the propagated event.

The entity may comprise a changed data item having a data item identifier, wherein obtaining data from the one or more corresponding data sources may comprise accessing data, including changed data, associated with the changed data item. The changed data item may be part of a graph, and wherein pre-caching the one or more data items may comprise invalidating an existing graph in the cache and writing an updated graph that includes the changed data item into the cache. Pre-caching the one or more data items may comprise replacing the data item in the cache with the changed data item.

The entity may comprise a user having a user identifier, the change event may correspond to a login operation of the user, and obtaining the data from the one or more corresponding data sources may comprise accessing user-specific information maintained in association with the user identifier. Accessing the user-specific information may comprise retrieving content identifiers associated with the user identifier, and writing data items associated with the content identifiers into the cache. Another change event corresponding to a user logout operation may be obtained, and user-specific information in the cache may be invalidated based on the change event.

One or more aspects are directed towards a change monitoring and signaling service configured to monitor one or more data sources for a change related to a data item, and to output a change event when a change related to a changed data item is detected, in which the change event identifies the changed data item. Described herein is a cache population service configured to obtain the change event and pre-cache one or more data items including the changed data item in a cache for anticipated future access.

The changed data item may be part of a graph, and the cache population service may invalidate an existing graph that includes the data item before the change, and may pre-cache a new graph that includes the changed data item into the cache. The cache population service may replace, in the cache, the data item before the change with the changed data item.

The change monitoring and signaling service may be further configured to detect user status changes corresponding to user login operations and user logout operations, and to output a user status change event for a user status change that identifies the user. A user-specific data caching service may obtain the user status change event, determine that the user status change event corresponds to a user login operation, and in response, may pre-cache one or more data items associated with the user.

The user-specific data caching service may comprise a watchlist service, and the data items associated with the user may comprise a pre-cached watchlist.

A user-specific data caching service may obtain the user status change event, determine that the user status change event corresponds to a user logout operation, and in response, may invalidate one or more data items cached in association with the user.

One or more aspects are directed towards receiving a propagated change event that identifies a changed data item that is changed relative to a corresponding data item before the change and obtaining data for the changed data item from one or more corresponding data sources. Aspects include invalidating an existing graph in a cache that includes the data item before the change and pre-caching an updated graph, which includes the changed data item, for anticipated future access in the cache.

Aspects may include monitoring for changes to data corresponding to data items, detecting a change to data corresponding to a data item, and publishing the change event that identifies the changed data item. Other aspects may include monitoring for changes to user login status, detecting a change to user login status, and publishing a user status change event that identifies a user and information corresponding to the status change. Still other aspects may include receiving the user status change event, and modifying the state of data in the cache based on the user status change event.

Example Computing Device

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
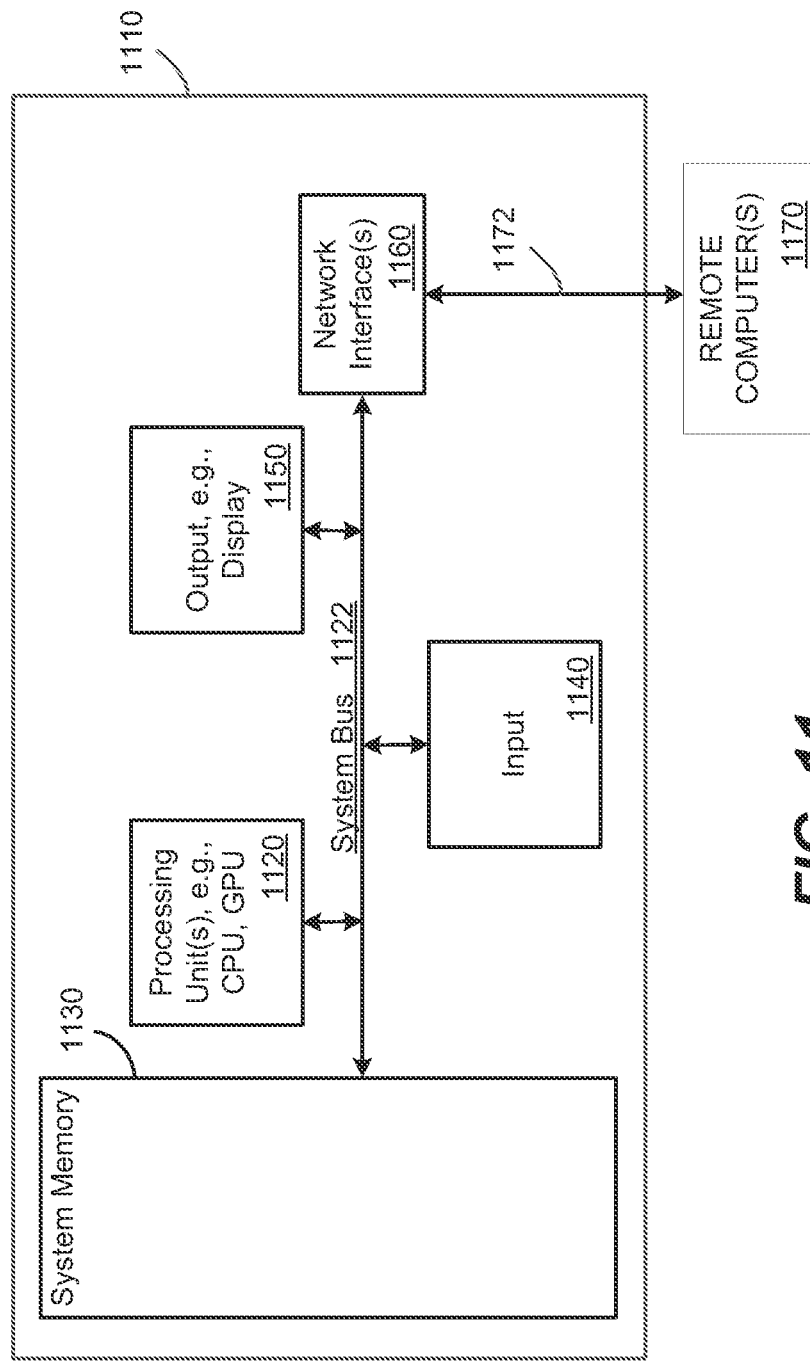
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system comprising:
   a processor; and
   a memory that stores executable instructions that, when executed by the processor, facilitate performance of operations, the operations comprising:
      receiving a message associated with an event, wherein the message comprises a type of the event and a data item associated with the event; and
      in response to determining that the event invalidates a first graph of user interface navigation elements pre-populated in a cache for anticipated future access, wherein the first graph of user interface navigation elements is associated with a user that interacts with a user interface menu comprising user interface navigation elements:
         generating a second graph of user interface navigation elements corresponding to the event,
         invalidating the first graph in the cache, and
         pre-populating the cache with the second graph for the anticipated future access.

2. The system of claim 1, wherein the operations further comprise subscribing to an event publishing service that publishes events comprising the event.

3. The system of claim 1, wherein the type of the event is an editorial override event associated with the data item.

4. The system of claim 1, wherein the type of the event is a news event that changes a broadcasting schedule associated with the data item.

5. The system of claim 1, wherein the user interface menu is customized for the user.

6. The system of claim 1, herein the user interface menu is associated with a video streaming service.

7. The system of claim 1, wherein the first graph of user interface navigation elements comprises a watchlist.

8. A method comprising:
   obtaining, by a system comprising a processor, a message associated with an event, where the message comprises a type of the event and a data item associated with the event; and
   in response to determining that the event invalidates a first graph of user interface navigation elements pre-populated in a cache for anticipated future access, wherein the first graph of user interface navigation elements is associated with a user that interacts with a user interface comprising user interface navigation elements:
      building, by the system, a second graph of user interface navigation elements corresponding to the event,
      invalidating, by the system, the first graph in the cache, and
      pre-populating, by the system, the cache with the second graph for the anticipated future access.

9. The method of claim 8, further comprising subscribing, by the system, to an event publishing service that publishes events comprising the event.

10. The method of claim 8, wherein the type of the event is an editorial override event associated with the data item.

11. The method of claim 8, wherein the type of the event is a news event that changes a broadcasting schedule associated with the data item.

12. The method of claim 8, wherein the user interface is customized for the user.

13. The method of claim 8, wherein the user interface is associated with a media streaming service.

14. The method of claim 8, wherein the second graph of user interface navigation elements comprises a watchlist.

15. A non-transitory machine-readable medium, comprising executable instructions, that when executed by a processor of a system, facilitate performance of operations, comprising:
   receiving a notification associated with an event, where the notification comprises a type of the event and a data item associated with the event; and
   in response to determining that the event invalidates a first graph of user interface navigation elements pre-populated in a cache for anticipated future access, wherein the first graph of user interface navigation elements is associated with a user that interacts with a watchlist comprising user interface navigation elements:

constructing a second graph of user interface navigation elements corresponding to the event, invalidating the first graph in the cache, and pre-populating the cache with the second graph for the anticipated future access.

16. The non-transitory machine-readable medium of claim 15, further comprising subscribing to an event publishing service that publishes events comprising the event.

17. The non-transitory machine-readable medium of claim 15, wherein the type of the event is an editorial override event associated with the data item.

18. The non-transitory machine-readable medium of claim 15, wherein the type of the event is a news event that changes a broadcasting schedule associated with the data item.

19. The non-transitory machine-readable medium of claim 15, wherein the watchlist is customized for the user.

20. The non-transitory machine-readable medium of claim 15, wherein the watchlist is customized for the user.

* * * * *